United States Patent [19]
Seriff

[11] Patent Number: 4,942,557
[45] Date of Patent: Jul. 17, 1990

[54] MARINE SEISMIC SYSTEM
[75] Inventor: Aaron J. Seriff, Houston, Tex.
[73] Assignee: Shell Oil Company, Houston, Tex.
[21] Appl. No.: 495,854
[22] Filed: May 18, 1983
[51] Int. Cl.$^5$ ............................ G01V 1/38; G01V 1/47
[52] U.S. Cl. ........................................ 367/15; 367/75; 367/16; 181/110
[58] Field of Search ................ 367/15, 16, 20, 21, 367/75, 144; 181/108, 110–112

[56]   References Cited
U.S. PATENT DOCUMENTS

| | | | |
|---|---|---|---|
| 2,354,548 | 7/1944 | Ricker | 367/75 |
| 2,729,300 | 1/1956 | Paslay et al. | 367/20 X |
| 3,212,600 | 10/1965 | Hensley, Jr. | 367/15 |
| 4,038,631 | 7/1977 | Murphy | 367/75 X |
| 4,219,096 | 8/1980 | Airhart | 367/75 X |
| 4,393,488 | 7/1983 | Gassaway | 367/75 |

OTHER PUBLICATIONS

Tatham, Robert H., "Seismic Shear Wave Observations . . . ", Oil and Gas Journal, Jan. 1984, pp. 110–114.
Neidell, N. S., Marine Application of Shear Waves, the Leading Edge of Exploration, Jan. 1986, pp. 65–67.
J. A. Coffeen, Seismic Exploration Fundamentals PPC Books, Tulsa Oklahoma, 1978, pp. 78 and 79.
Lewis et al., Converted Shear Waves as seen by Ocean Bottom Seismeters & Surface Bouys, 10/77, vol. 67, #5, pp. 1291–1302, Seis. Soc. America.

Primary Examiner—Brian S. Steinberger

[57]   ABSTRACT

A method of marine seismic exploration of the strata beneath a body of water comprising the steps of generating a compressional wave in the body of water and sensing the converted shear waves reflected from the strata.

11 Claims, 3 Drawing Sheets

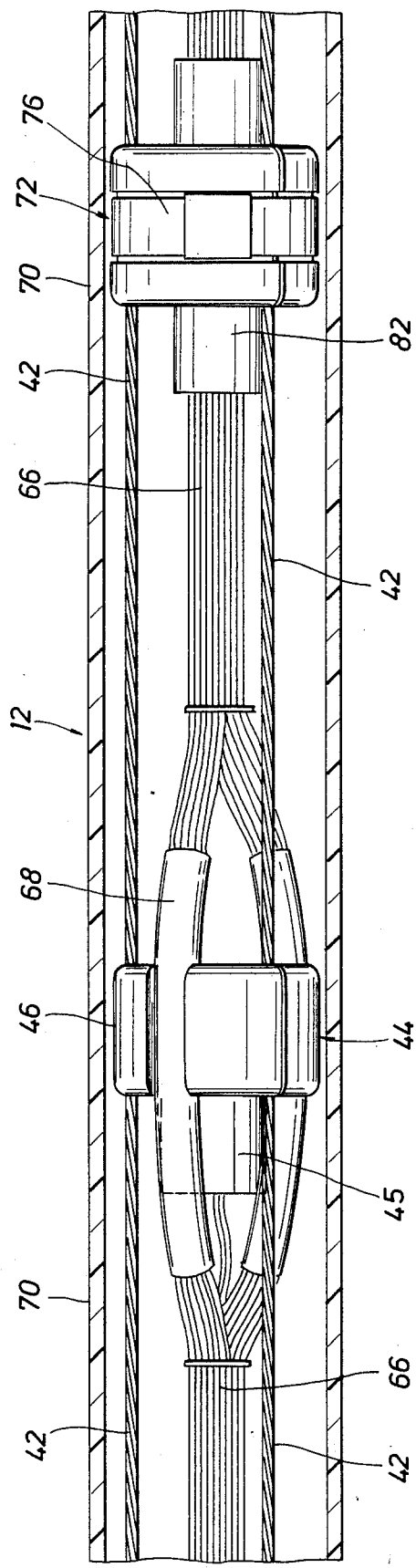
FIG. 3
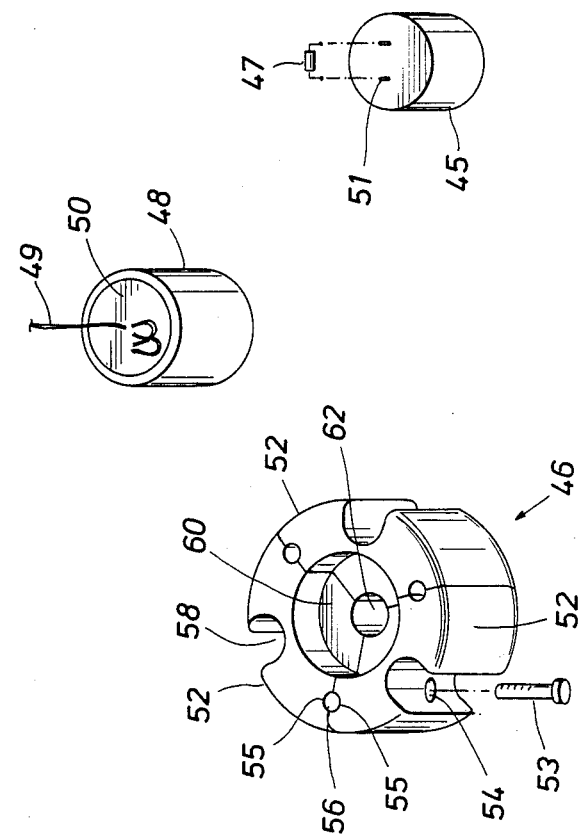

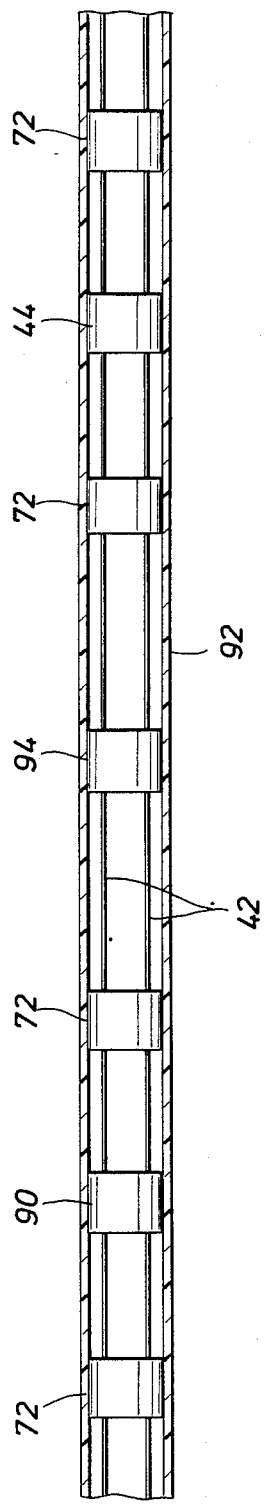

MARINE SEISMIC SYSTEM

BACKGROUND OF THE INVENTION

This invention relates generally to seismic exploration of substrata beneath bodies of water and, more particularly, to a method of marine seismic exploration for sensing converted shear waves reflected from such substrata in response to a downwardly travelling compressional wave.

Marine seismic exploration is generally conducted by towing a seismic streamer at a given depth through the ocean or other body of water. The streamer is provided with a plurality of pressure sensors, such as hydrophones, disposed at appropriate intervals along its length. Compressional wave energy is provided in the vicinity of the cable by an air gun or other suitable means; this compressional wave energy travels downwardly through the earth with a portion of it being reflected upwardly at levels where there is a contrast in the acoustic impedance characteristics of the strata. The pressure sensors detect the compressional waves produced in the water by the upwardly travelling seismic reflections and provide electrical signals indicative thereof to suitable processing and recording equipment located on the seismic vessel that is towing the streamer. It has been found that shear waves are generated from the compressional waves at interfaces in the strata; these shear waves contain additional information on the nature of the strata. However, this data is not considered since the reflected shear waves are not sensed by the marine seismic systems of the prior art.

Therefore, it is an object of the present invention to provide a method of marine seismic exploration which detects the converted shear waves reflected from the strata during seismic exploration with a compressional source.

SUMMARY OF THE INVENTION

In accordance with the present invention there is provided a method of marine seismic exploration of the strata beneath a body of water comprising the steps of generating a compressional wave in the body of water and sensing the converted shear waves reflected from the strata. The sensing of the converted shear waves is accomplished by positioning a plurality of seismic transducers, which are adapted to detect shear waves, on the seafloor in the area of interest, such as geophones detecting horizontal motion. Since in most instances the converted shear waves have their strongest motion in the horizontal component of motion pointed towards the source, it is preferable to record this component. It has also been determined that this component is relatively free of motion due to reflected compressional waves. Further separation can be carried out, if desired, on the in-line recordings by conventional means known to those versed in the art of seismic exploration with compressional waves. Preferably, the transducers are allowed to settle for a predetermined period of time before the compressional wave is generated to ensure proper coupling of the transducers with the seafloor and to ensure that the noise transients generated during positioning of the transducers have been attenuated. Each of the transducers can be positioned individually at a predetermined location, or the transducers can be disposed within a cable which is laid on the seabed. The use of a cable with horizontal motion detectors aligned with the axis of the cable has the advantage of providing an easy means of aligning all of these components in a preferred direction, for example, towards the source, by laying out the cable so that its orientation is known. The compressional waves can be generated by any suitable means, for example, an air gun for ejecting a predetermined quantity of compressed gas into the water. If desired, pressure transducers, such as hydrophones, can also be employed in the cable to detect the compressional waves reflected from the strata.

Other objectives, advantages and applications of the present invention will be made apparent by the following detailed description of the preferred embodiments of the present invention.

BRIEF DESCRIPTION OF THE DRAWINGS

FIG. 3 is a sectional view of a marine cable for use with the method of the present invention.

FIG. 4 is an exploded view of the geophone assembly and mount incorporated in the marine cable shown in FIG. 3.

FIG. 5 is an elevational view of the weight assembly incorporated in the marine cable of FIG. 3.

FIG. 6 is a diagrammatic view of a marine cable for use with the method of the present invention which includes geophones and pressure transducers.

FIG. 7 is a diagrammatic view of a seismic survey utilizing individual geophone stations positioned on the ocean bottom according to the method of the present invention.

DETAILED DESCRIPTION OF THE PREFERRED EMBODIMENTS

Figure 1:
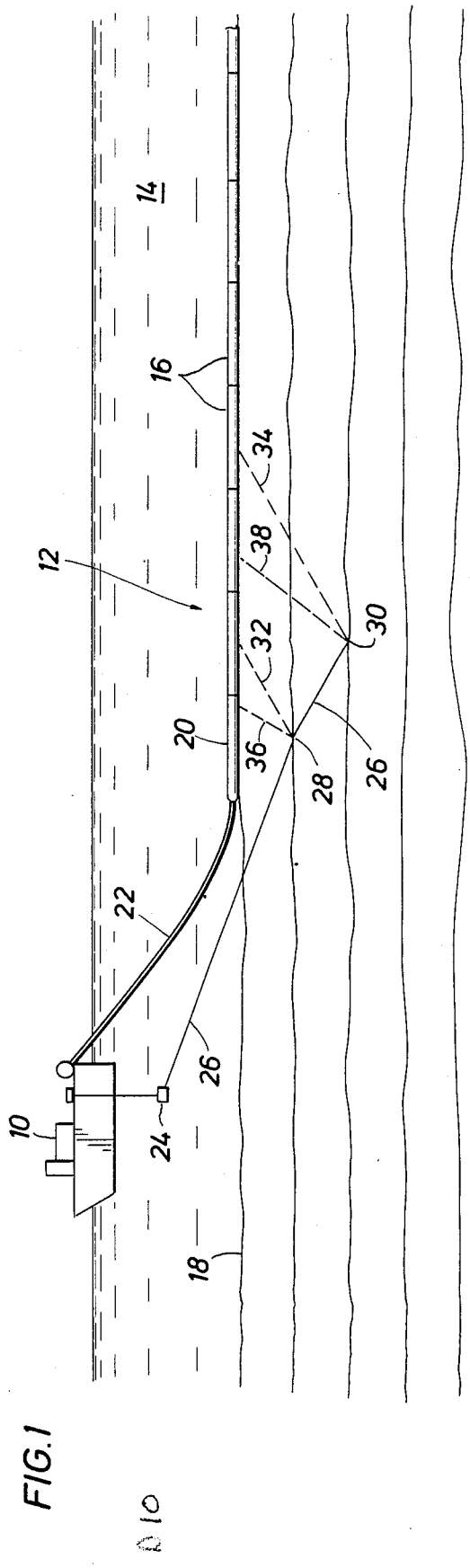
FIG. 1 is a diagrammatic view of a seismic survey utilizing a marine cable according to the method of the present invention.
Figure 2:
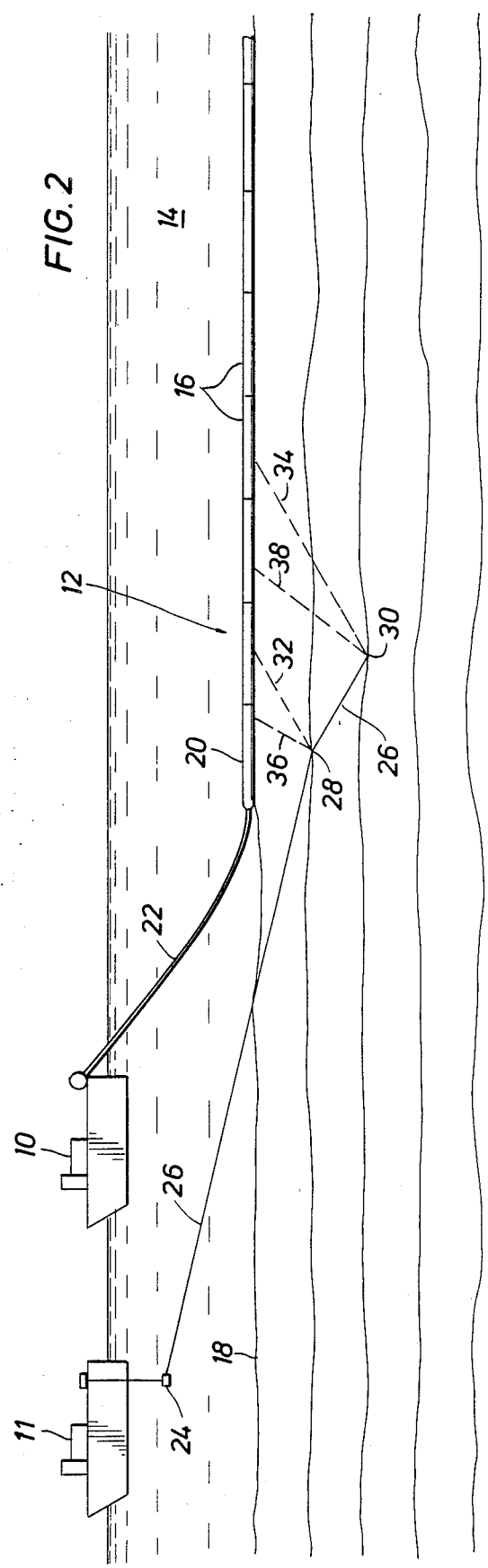
FIG. 2 is a diagrammatic view of a seismic survey utilizing separate vessels to deploy the seismic source and cable according to the method of the present invention.

Referring to FIG. 1, a seismic exploration vessel 10 is shown deploying a marine cable 12 to seismically explore the substrata beneath body of water 14. Cable 12 can be quite lengthy, for example, a mile or more, and is normally composed of a number of individual active sections 16 connected end to end. Each section 16 contains a plurality of geophones (not shown) and is positioned adjacent bottom 18. Cable 12 can be positioned on bottom 18 in the desired location by dragging it to the desired location or by reeling it in and then unreeling it at the desired location as vessel 10 moves forward. Section 20 of cable 12 which is connected to the first section 16 is a weighted section containing, for example, lead or other suitable material. Lead-in section 22, which can be an armored cable, connects section 20 to vessel 10. Section 20 should contain sufficient weight so that the waves in body of water 14 acting on vessel 10 and lead-in section 22 do not tend to decouple sections 16 from bottom 18. If desired, the tail end of cable 12 can also be provided with a weighted section 20 and a suitable location buoy, as is known in the art. Compressional wave energy is provided in the vicinity of cable 12 by an air gun 24 or other suitable means; air gun 24 can be deployed from vessel 10 or a second vessel as indicated in FIG. 2, which can move in the vicinity of the geophones without moving cable 12. When air gun 24 is deployed from vessel 11, it can be useful to record many explosions taken over a path parallel to cable 12 and extending beyond the ends thereof without moving cable 12. The paths of vessel 11 may extend beyond the ends of cable 12, for example, to a distance of the same order of magnitude as the depth of the deepest strata to be studied. Compressional wave 26, which is generated by air gun 24 and is indicated by a straight line, travels downwardly through body of water 14 and the earth with a portion of it being reflected upwardly at points where there is a contrast in the acoustic impedance between layers of the strata, for example, points 28 and 30, where a portion of compressional wave 26 is reflected upwardly as indicated by reflected compressional waves 32 and 34. The size of such a reflection is related primarily to the contrast in compressional wave acoustic impedance. In addition, converted shear waves 36 and 38 are reflected at points 28 and 30 respectively. The size of converted shear waves 36 and 38 is related primarily to the contrast in shear wave acoustic impedance. Reflected shear waves 36 and 38 travel upwardly through the strata and are detected by the geophones located in sections 16 of cable 12. The electric signals produced by the geophones in response to the reflected shear waves are transmitted along wires in cable 12 to suitable recording and/or processing equipment located on vessel 10. In addition, if desired, hydrophones or other compressional wave transducers, for example, geophones detecting vertical motion, can be positioned in active sections 16 to detect reflected compressional waves 32 and 34. It is also possible to position geophones in cable 12 to detect horizontal motion that is perpendicular to cable 12. It should be noted that cable 12 should be allowed to settle for a predetermined period of time, for example, 10–12 seconds have been found to be a suitable length of time after the cable has been towed into position at a speed of three knots, before an air gun 24 is activated to ensure that cable 12 is properly coupled to bottom 18 to ensure that the noise transients generated during the positioning of cable 12 have been attenuated. The cable in the vicinity of the geophones should be sufficiently dense, for example, several times the density of seawater, to promote settling and coupling of the geophones.

Referring to FIGS. 3, 4 and 5, a preferred embodiment of a cable for implementing the present invention is described. Cable 12 has three stress members 42 which are maintained in the shape of an equilateral triangle by a plastic spacer (not shown), as is known in the art. At predetermined locations along cable 12 geophone assemblies 44 are positioned such that geophones 45 are in line with the axis of cable 12. Each geophone assembly 44 includes a conventional geophone 45, which is used to detect horizontal motion, and a mount 46 adapted for securing geophone 45 at a predetermined location along cable 12. A damping resistor 47 is connected across terminals 51 of geophone 45, and wires 49 are connected to terminals 51. Preferably, geophone 45 and damping resistor 47 are positioned in protective housing 48, such as PVC tubing, and the ends of housing 48 are sealed by epoxy 50 or the like to protect geophone 45 from corrosion and pressure damage. Mount 46 comprises three similarly shaped segments 52 which form a cylindrical housing or mount when assembled by screws 53 in apertures 54. Both ends of each segment 52 have a groove 55 which mates with grooves 55 in the adjacent segments 52 to form apertures 56 which are sized and positioned to accommodate the three stress members 42. Central cavity 60 is sized such that housing 48 is held securely therein when screws 53 are tightened. Mount 46 can be provided with a further smaller cavity 62 adjacent to central cavity 60 for epoxy or the like to further ensure proper bonding between mount 46 and housing 48. Each of sections 52 has a groove 58 in its outer surface, and approximately one-third of the wires from group of wires 66 are wrapped in a protective cover 68, such as polyurethane, and positioned in each of grooves 58. Wires 49 from terminals 51 are connected to a pair of wires from group of wires 66 by conventional means. Mount 46 should be made of a relatively heavy material that resists deformation and corrosion, such as brass, to ensure that geophone 45 is properly coupled to the ocean bottom.

Weight assembly 72 can be made of, for example, lead or other suitable material and preferably are positioned equidistantly on each side of geophone assembly 44 to ensure that cable 12 settles and is properly coupled to the ocean bottom. Weight assembly 72 consists of three sections 74 that are held together to form a cylinder by metal strap 76 or other suitable means. Each of sections 74 has a groove 75 in each end such that when sections 74 are held together by strap 76 grooves 75 form apertures 78 which are sized to accommodate stress members 42. Weight assembly 72 has a central aperture 80 which is sized to accommodate group of wires 66. A protective covering 82, such as polyurethane, can be inserted in central aperture 80 to prevent chafing of group of wires 66. Cable 12 is provided with a jacket 70 of, for example, polyurethane plastic, which provides a relatively smooth and damage resistant outer surface, and is filled with a suitable liquid, such as kerosene.

FIG. 6 illustrates an alternative embodiment of the cable which includes both geophones and pressure transducers. Geophone assemblies 44 and hydrophones 90 or other suitable pressure transducers are positioned at predetermined locations along cable 92 so that geophone assemblies 44 and hydrophones 90 are interspersed. Hydrophones 90 can be mounted by conventional means as is known in the art. Preferably, weight assemblies 72 are positioned equidistantly on each side of geophone assemblies 44 and hydrophones 90. Stress members 42 can be maintained in proper orientation by conventional spacers 94 located between geophone assemblies 44 and hydrophones 90.

Referring to FIG. 7, an alternative method of implementing the present invention is illustrated. FIG. 7 is similar to FIG. 1 and hence like elements have been given like numerals. However, marine cable 12 of FIG. 1 has been replaced by sensing units 84 which contain at least one geophone and the necessary automatic recording equipment to record the seismic data sensed by the geophones. Alternatively, sensing units 84 can provide the sensed seismic signal by electric wire to suitable recording equipment associated with a buoy 86 on the surface of body of water 14 or to suitable transmitting equipment associated with buoy 86 for radio transmission to the recording equipment which can be located, for example, on vessel 10. Sensing units 84 can be positioned by divers or by dropping them overboard from seismic vessel 10. In any event, the geophone or geophones in sensing units 84 must be arranged so that they sense the reflected shear waves generated by the conversion of the compressional wave at points where there is a difference in the acoustic impedance of the strata, such as points 28 and 30. For example, a pair of geophones which detect horizontal motion in two directions at right angles to each other can be used.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of marine seismic exploration of the earth strata beneath a body of water, said method comprising the steps of:

generating in said body of water downwardly travelling compressional waves and sensing at the interface between said body of water and earth strata upwardly travelling reflected shear waves that have been converted at said earth strata from said downwardly travelling compressional waves.

2. A method as recited in claim 1, wherein said sensing step comprises positioning a plurality of seismic transducers, which are adapted to detect shear waves, on the seafloor.

3. A method as recited in claim 2, wherein said positioning step comprises positioning a marine cable containing said plurality of seismic transducers on the seafloor.

4. A method as recited in claim 3, wherein said sensing step further comprises waiting at least a predetermined period of time after positioning the marine cable before generating the compressional wave.

5. A method as recited in claim 4, wherein said compressional wave generating step comprises injecting a predetermined quantity of compressed gas into the body of water.

6. A method as recited in claim 2, wherein said sensing step further comprises waiting at least a predetermined period of time after positioning the plurality of seismic transducers before generating the compressional wave.

7. A method as recited in claim 2, wherein said positioning step comprises positioning each seismic transducer individually at a predetermined location on the seafloor.

8. A method as recited in claim 7, wherein said compressional wave generating step comprises injecting a predetermined quantity of compressed gas into the body of water.

9. A method as recited in claim 3, wherein said step of positioning said marine cable on the seafloor is performed by a first vessel and said step of generating a compressional wave is performed by a second vessel.

10. A method as recited in claim 9, wherein said step of generating a compressional wave comprises generating a plurality of compressional waves along a line that is parallel to the cable.

11. A method as recited in claim 10, wherein said step of generating a compressional wave comprises injecting a predetermined quantity of compressed gas into the body of water.

* * * * *